United States Patent
Lifar et al.

(10) Patent No.: US 10,387,115 B2
(45) Date of Patent: Aug. 20, 2019

(54) METHOD AND APPARATUS FOR GENERATING A RECOMMENDED SET OF ITEMS

(71) Applicant: YANDEX EUROPE AG, Lucerne (CH)

(72) Inventors: Igor Igorevich Lifar, Krasnodar region (RU); Mikhail Aleksandrovich Royzner, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 158 days.

(21) Appl. No.: 15/262,332

(22) Filed: Sep. 12, 2016

(65) Prior Publication Data

US 2017/0090867 A1   Mar. 30, 2017

(30) Foreign Application Priority Data

Sep. 28, 2015 (RU) ................................ 2015141110

(51) Int. Cl.
  *G06F 7/24* (2006.01)
  *G06F 16/9535* (2019.01)
  *G06F 16/9038* (2019.01)

(52) U.S. Cl.
  CPC ............ *G06F 7/24* (2013.01); *G06F 16/9038* (2019.01); *G06F 16/9535* (2019.01)

(58) Field of Classification Search
  CPC ................. G06F 7/24; G06F 17/30991; G06F 17/30867; G06F 16/9535; G06F 16/9038
  (Continued)

(56) References Cited

U.S. PATENT DOCUMENTS 7,007,242 B2   2/2006 Suomela et al.
7,328,216 B2 * 2/2008 Hofmann .......... G06F 17/30699
  (Continued)

FOREIGN PATENT DOCUMENTS

CN   103077220 A   5/2013
CN   103167330 A   6/2013
  (Continued)

OTHER PUBLICATIONS

English Abstract for CN104317835 retrieved on Espacenet on May 7, 2018.
  (Continued)

*Primary Examiner* — Phuong Thao Cao
(74) *Attorney, Agent, or Firm* — BCF LLP

(57) ABSTRACT

A method of generating a recommended subset of items for a user of an electronic device, the method being executed at a server, the method comprises: acquiring user events associated with a plurality of users, the user events comprising indications of user queries; for each of the user queries, generating a ranked predicted items list that comprises at least some items from a set of potentially recommendable items, such that each particular item within the ranked predicted items list has an associated rank; for each item within a plurality of ranked predicted items lists, generating, by the server, an item score based on a totality of ranks associated therewith; generating the recommended subset of items from the set of potentially recommendable items by selecting at least one item within the plurality of ranked predicted items lists as the recommended subset of items based on the item scores.

18 Claims, 7 Drawing Sheets

(58) Field of Classification Search
USPC .......................................................... 707/735
See application file for complete search history.

(56) References Cited

U.S. PATENT DOCUMENTS

| | | | |
|---|---|---|---|
| 7,502,789 B2 | 3/2009 | Yao et al. | |
| 7,540,051 B2 | 6/2009 | Gundersen et al. | |
| D613,300 S | 4/2010 | Chaudhri | |
| 7,849,076 B2* | 12/2010 | Zheng | G06F 17/30675 |
| | | | 707/715 |
| 8,010,527 B2 | 8/2011 | Denoue et al. | |
| 8,244,740 B2 | 8/2012 | Gruenhagen et al. | |
| 8,271,898 B1 | 9/2012 | Mattos et al. | |
| 8,285,602 B1* | 10/2012 | Yi | G06Q 30/00 |
| | | | 705/26.7 |
| 8,290,818 B1* | 10/2012 | Levitan | G06Q 30/0631 |
| | | | 705/26.7 |
| 8,301,623 B2 | 10/2012 | Chakrabarti et al. | |
| 8,386,955 B1 | 2/2013 | Weber et al. | |
| 8,412,726 B2 | 4/2013 | Yan et al. | |
| 8,429,184 B2 | 4/2013 | Ismalon | |
| 8,478,664 B1 | 7/2013 | Xavier et al. | |
| 8,510,252 B1 | 8/2013 | Gargi et al. | |
| D693,833 S | 11/2013 | Inose et al. | |
| 8,600,968 B2 | 12/2013 | Holenstein et al. | |
| 8,606,792 B1 | 12/2013 | Jackson et al. | |
| 8,676,736 B2 | 3/2014 | Pilaszy et al. | |
| 8,683,374 B2 | 3/2014 | Vaughan et al. | |
| 8,712,937 B1 | 4/2014 | Bacus et al. | |
| 8,751,507 B2* | 6/2014 | Kim | G06F 17/30699 |
| | | | 707/706 |
| 8,869,042 B2* | 10/2014 | Kast | G06F 16/95 |
| | | | 715/747 |
| 8,886,797 B2 | 11/2014 | Gannu et al. | |
| 8,893,042 B2 | 11/2014 | Laurie et al. | |
| 8,893,043 B2 | 11/2014 | Dodson et al. | |
| 8,903,834 B2 | 12/2014 | Ciancutti et al. | |
| 8,910,070 B2 | 12/2014 | Goodger et al. | |
| 8,914,399 B1* | 12/2014 | Paleja | G06F 16/9535 |
| | | | 707/767 |
| 8,972,865 B2 | 3/2015 | Hansen et al. | |
| 8,983,888 B2 | 3/2015 | Nice et al. | |
| 8,996,530 B2 | 3/2015 | Luvogt et al. | |
| 9,053,416 B1 | 6/2015 | De Leo et al. | |
| 9,098,248 B2 | 8/2015 | Suzuki et al. | |
| 9,122,989 B1 | 9/2015 | Morris et al. | |
| 9,348,898 B2 | 5/2016 | Nice et al. | |
| 9,405,741 B1 | 8/2016 | Schaaf et al. | |
| 9,473,803 B2 | 10/2016 | Wang | |
| 9,569,785 B2 | 2/2017 | Alon et al. | |
| 9,660,947 B1 | 5/2017 | Hart | |
| 9,785,883 B2* | 10/2017 | LuVogt | G06N 3/006 |
| 9,836,533 B1 | 12/2017 | Levi et al. | |
| 9,836,765 B2* | 12/2017 | Hariri | G06Q 30/0269 |
| 9,900,659 B1 | 2/2018 | Norum et al. | |
| 2002/0054164 A1 | 5/2002 | Uemura | |
| 2002/0198882 A1 | 12/2002 | Linden et al. | |
| 2004/0158497 A1 | 8/2004 | Brand | |
| 2004/0260621 A1* | 12/2004 | Foster | G06Q 30/02 |
| | | | 705/26.62 |
| 2005/0076365 A1 | 4/2005 | Popov et al. | |
| 2005/0097190 A1 | 5/2005 | Abdelhak | |
| 2006/0031114 A1 | 2/2006 | Zommers | |
| 2006/0041548 A1 | 2/2006 | Parsons et al. | |
| 2006/0293065 A1 | 12/2006 | Chew et al. | |
| 2008/0222132 A1* | 9/2008 | Pan | G06F 16/9535 |
| 2008/0250039 A1* | 10/2008 | Franks | G06F 17/30053 |
| 2008/0256017 A1 | 10/2008 | Murakami | |
| 2008/0266289 A1 | 10/2008 | Park | |
| 2008/0294617 A1 | 11/2008 | Chakrabarti et al. | |
| 2009/0006371 A1 | 1/2009 | Denoue | |
| 2009/0006373 A1* | 1/2009 | Chakrabarti | G06F 16/335 |
| 2009/0055385 A1 | 2/2009 | Jeon et al. | |
| 2009/0150935 A1 | 6/2009 | Peters et al. | |
| 2009/0163183 A1 | 6/2009 | O'Donoghue et al. | |
| 2009/0249217 A1 | 10/2009 | Narayanaswami | |
| 2009/0276368 A1 | 11/2009 | Martin et al. | |
| 2009/0327941 A1 | 12/2009 | Fong et al. | |
| 2010/0050067 A1 | 2/2010 | Curwen et al. | |
| 2010/0070454 A1 | 3/2010 | Masuda et al. | |
| 2010/0070928 A1 | 3/2010 | Goodger et al. | |
| 2010/0131844 A1 | 5/2010 | Wohlert | |
| 2010/0175018 A1 | 7/2010 | Petschnigg et al. | |
| 2010/0205542 A1 | 8/2010 | Walman | |
| 2010/0251304 A1 | 9/2010 | Donoghue et al. | |
| 2010/0312650 A1* | 12/2010 | Pinckney | G06F 17/30867 |
| | | | 705/14.66 |
| 2010/0312724 A1* | 12/2010 | Pinckney | G06N 99/005 |
| | | | 706/11 |
| 2011/0029636 A1* | 2/2011 | Smyth | G06F 16/958 |
| | | | 709/217 |
| 2011/0035388 A1 | 2/2011 | Im et al. | |
| 2011/0047136 A1 | 2/2011 | Dehn | |
| 2011/0047491 A1 | 2/2011 | Hwang et al. | |
| 2011/0066497 A1 | 3/2011 | Gopinath et al. | |
| 2011/0072011 A1* | 3/2011 | Qiao | G06F 17/30687 |
| | | | 707/723 |
| 2011/0107223 A1 | 5/2011 | Tilton et al. | |
| 2011/0112981 A1 | 5/2011 | Park et al. | |
| 2011/0179081 A1* | 7/2011 | Ovsjanikov | G06F 17/30867 |
| | | | 707/780 |
| 2011/0208732 A1 | 8/2011 | Melton et al. | |
| 2011/0213761 A1* | 9/2011 | Song | G06F 17/30867 |
| | | | 707/706 |
| 2011/0246406 A1 | 10/2011 | Lahav et al. | |
| 2011/0252050 A1* | 10/2011 | Palleti | G06F 17/30876 |
| | | | 707/769 |
| 2011/0258185 A1* | 10/2011 | Acharya | G06Q 30/0246 |
| | | | 707/725 |
| 2011/0302117 A1* | 12/2011 | Pinckney | G06Q 30/02 |
| | | | 706/12 |
| 2011/0302158 A1 | 12/2011 | Sanders | |
| 2011/0320450 A1 | 12/2011 | Liu et al. | |
| 2012/0030159 A1 | 2/2012 | Pilaszy et al. | |
| 2012/0054794 A1 | 3/2012 | Kim et al. | |
| 2012/0059707 A1 | 3/2012 | Goenka et al. | |
| 2012/0143871 A1 | 6/2012 | Liebald et al. | |
| 2012/0158685 A1 | 6/2012 | White et al. | |
| 2012/0191776 A1 | 7/2012 | Ruffner et al. | |
| 2012/0209907 A1 | 8/2012 | Andrews et al. | |
| 2012/0254097 A1 | 10/2012 | Flinn et al. | |
| 2012/0304073 A1 | 11/2012 | Mandic et al. | |
| 2012/0317104 A1 | 12/2012 | Radlinski et al. | |
| 2013/0009990 A1 | 1/2013 | Hsu et al. | |
| 2013/0024471 A1 | 1/2013 | Mitrovic | |
| 2013/0031090 A1* | 1/2013 | Posse | G06F 17/30867 |
| | | | 707/723 |
| 2013/0041896 A1* | 2/2013 | Ghani | G06F 17/30699 |
| | | | 707/732 |
| 2013/0046772 A1 | 2/2013 | Gu et al. | |
| 2013/0047112 A1 | 2/2013 | Waeller | |
| 2013/0073988 A1* | 3/2013 | Groten | G06Q 30/02 |
| | | | 715/753 |
| 2013/0111395 A1 | 5/2013 | Ying et al. | |
| 2013/0132515 A1 | 5/2013 | Mostafa et al. | |
| 2013/0158693 A1 | 6/2013 | Beckmann et al. | |
| 2013/0159243 A1* | 6/2013 | Wei | H04N 21/26258 |
| | | | 706/54 |
| 2013/0194308 A1 | 8/2013 | Privault et al. | |
| 2013/0204737 A1* | 8/2013 | Agarwal | G06Q 30/0282 |
| | | | 705/26.7 |
| 2013/0227054 A1 | 8/2013 | Zhang et al. | |
| 2013/0262478 A1 | 10/2013 | Kemp et al. | |
| 2013/0290110 A1 | 10/2013 | Luvogt et al. | |
| 2013/0290905 A1 | 10/2013 | Luvogt et al. | |
| 2013/0297698 A1* | 11/2013 | Odero | H04L 69/24 |
| | | | 709/204 |
| 2013/0311408 A1 | 11/2013 | Bagga et al. | |
| 2013/0346182 A1 | 12/2013 | Cheng et al. | |
| 2013/0346234 A1 | 12/2013 | Hendrick et al. | |
| 2014/0006399 A1 | 1/2014 | Vasudevan et al. | |
| 2014/0025532 A1 | 1/2014 | Huang et al. | |
| 2014/0025609 A1 | 1/2014 | Coster et al. | |

(56) References Cited

U.S. PATENT DOCUMENTS

| | | | |
|---|---|---|---|
| 2014/0032678 A1* | 1/2014 | Koukoumidis | G06F 17/30867 709/205 |
| 2014/0040776 A1 | 2/2014 | Dann et al. | |
| 2014/0074856 A1 | 3/2014 | Rao et al. | |
| 2014/0095967 A1 | 4/2014 | Cheng et al. | |
| 2014/0101142 A1 | 4/2014 | Gomez et al. | |
| 2014/0122605 A1 | 5/2014 | Merom et al. | |
| 2014/0129500 A1 | 5/2014 | Nice et al. | |
| 2014/0136528 A1 | 5/2014 | Anima et al. | |
| 2014/0137013 A1 | 5/2014 | Matas | |
| 2014/0143012 A1 | 5/2014 | Alon et al. | |
| 2014/0143738 A1 | 5/2014 | Underwood et al. | |
| 2014/0156681 A1 | 6/2014 | Lee et al. | |
| 2014/0164365 A1 | 6/2014 | Graham | |
| 2014/0172544 A1 | 6/2014 | Rabkin | |
| 2014/0172545 A1 | 6/2014 | Rabkin | |
| 2014/0181121 A1 | 6/2014 | Nice et al. | |
| 2014/0189014 A1 | 7/2014 | Dolan et al. | |
| 2014/0195890 A1 | 7/2014 | Taylor et al. | |
| 2014/0201675 A1 | 7/2014 | Joo et al. | |
| 2014/0250390 A1 | 9/2014 | Holmes et al. | |
| 2014/0278786 A1 | 9/2014 | Liu-Qiu-Yan | |
| 2014/0280080 A1* | 9/2014 | Solheim | G06F 17/3053 707/723 |
| 2014/0280221 A1* | 9/2014 | Chuang | G06F 17/3053 707/748 |
| 2014/0280565 A1 | 9/2014 | Grewal | |
| 2014/0298263 A1 | 10/2014 | Maeda et al. | |
| 2014/0316930 A1* | 10/2014 | Jain | G06F 17/30867 705/26.5 |
| 2014/0317105 A1* | 10/2014 | Jain | G06F 16/9535 707/731 |
| 2014/0358916 A1* | 12/2014 | Anand | G06F 17/30991 707/732 |
| 2014/0359489 A1 | 12/2014 | Zhao et al. | |
| 2014/0365853 A1 | 12/2014 | Kleinhout et al. | |
| 2014/0365854 A1 | 12/2014 | Karunamuni et al. | |
| 2014/0379893 A1 | 12/2014 | Kannan et al. | |
| 2015/0006286 A1 | 1/2015 | Liu et al. | |
| 2015/0052003 A1 | 2/2015 | Tang et al. | |
| 2015/0066643 A1 | 3/2015 | Choi et al. | |
| 2015/0088921 A1* | 3/2015 | Somaiya | G06F 16/248 707/767 |
| 2015/0100587 A1 | 4/2015 | Walkingshaw et al. | |
| 2015/0112801 A1 | 4/2015 | Nice et al. | |
| 2015/0120712 A1 | 4/2015 | Yi et al. | |
| 2015/0120722 A1 | 4/2015 | Martin et al. | |
| 2015/0154197 A1* | 6/2015 | Lightner | G06F 16/90324 707/748 |
| 2015/0161256 A1* | 6/2015 | Jeh | G06F 17/30867 707/707 |
| 2015/0161672 A1 | 6/2015 | Jung et al. | |
| 2015/0178282 A1 | 6/2015 | Gorur et al. | |
| 2015/0189070 A1 | 7/2015 | Baker | |
| 2015/0242492 A1 | 8/2015 | Bhatt et al. | |
| 2015/0269370 A1 | 9/2015 | Phillips | |
| 2015/0269488 A1 | 9/2015 | Galai et al. | |
| 2015/0278706 A1* | 10/2015 | Shivashankar | G06N 99/005 706/12 |
| 2015/0312348 A1* | 10/2015 | Lustgarten | H04L 67/12 705/14.66 |
| 2015/0325094 A1 | 11/2015 | Cheng et al. | |
| 2015/0330805 A1 | 11/2015 | Cho et al. | |
| 2015/0331859 A1 | 11/2015 | Raichelgauz et al. | |
| 2015/0331951 A1 | 11/2015 | Wang et al. | |
| 2015/0347358 A1 | 12/2015 | Shultz et al. | |
| 2015/0370798 A1 | 12/2015 | Ju et al. | |
| 2015/0378707 A1 | 12/2015 | Park et al. | |
| 2015/0379146 A1 | 12/2015 | Tonse et al. | |
| 2016/0004394 A1 | 1/2016 | MacAdaan et al. | |
| 2016/0055242 A1* | 2/2016 | Bradic | G06F 17/3089 707/728 |
| 2016/0063065 A1* | 3/2016 | Khatri | G06F 17/30867 707/723 |
| 2016/0070803 A1* | 3/2016 | Nuckolls | G06F 17/3069 707/730 |
| 2016/0110363 A1 | 4/2016 | Tkach et al. | |
| 2016/0112760 A1 | 4/2016 | Kosseifi et al. | |
| 2016/0147753 A1 | 5/2016 | Dimson et al. | |
| 2016/0154887 A1 | 6/2016 | Zhao | |
| 2016/0170982 A1 | 6/2016 | Djuric et al. | |
| 2016/0196244 A1 | 7/2016 | Greenberg et al. | |
| 2016/0275804 A1 | 9/2016 | Koppel et al. | |
| 2016/0299992 A1 | 10/2016 | Cetintas et al. | |
| 2016/0328480 A1 | 11/2016 | Owens et al. | |
| 2016/0350812 A1 | 12/2016 | Priness et al. | |
| 2016/0371274 A1* | 12/2016 | Ng | G06F 17/3053 |
| 2017/0011112 A1* | 1/2017 | Jing | G06F 17/30864 |
| 2017/0017369 A1 | 1/2017 | Kanter et al. | |
| 2017/0024391 A1* | 1/2017 | Steck | G06F 17/3053 |
| 2017/0024657 A1* | 1/2017 | Sahu | G06N 7/02 |
| 2017/0060870 A1* | 3/2017 | Checkley | G06F 17/3053 |
| 2017/0060872 A1 | 3/2017 | Sacheti et al. | |
| 2017/0061014 A1 | 3/2017 | Heiler et al. | |
| 2017/0061286 A1 | 3/2017 | Kumar et al. | |
| 2017/0068992 A1 | 3/2017 | Chen et al. | |
| 2017/0076318 A1 | 3/2017 | Goswami et al. | |
| 2017/0083965 A1* | 3/2017 | Sun | G06F 17/30 |
| 2017/0091194 A1* | 3/2017 | Spiegel | G06F 17/3053 |
| 2017/0103343 A1 | 4/2017 | Yee et al. | |
| 2017/0132230 A1 | 5/2017 | Muralidhar et al. | |
| 2017/0293865 A1 | 10/2017 | Sandler | |
| 2017/0337612 A1 | 11/2017 | Galron et al. | |
| 2018/0011937 A1 | 1/2018 | Tikhonov | |
| 2018/0014038 A1 | 1/2018 | Lamburt et al. | |
| 2018/0075137 A1 | 3/2018 | Lifar | |

FOREIGN PATENT DOCUMENTS

| | | | | |
|---|---|---|---|---|
| CN | 103473354 A | * | 12/2013 | |
| CN | 103559262 A | | 2/2014 | |
| CN | 103678672 A | | 3/2014 | |
| CN | 103838842 A | | 6/2014 | |
| CN | 103942288 A | | 7/2014 | |
| CN | 104102696 A | | 10/2014 | |
| CN | 104317835 A | | 1/2015 | |
| CN | 104503973 A | | 4/2015 | |
| CN | 104636371 A | | 5/2015 | |
| CN | 303532062 S | | 12/2015 | |
| CN | 105893398 A | | 8/2016 | |
| CN | 106446195 A | | 2/2017 | |
| CN | 106777229 A | | 5/2017 | |
| CN | 106802915 A | | 6/2017 | |
| CN | 106815297 A | | 6/2017 | |
| CN | 106874374 A | | 6/2017 | |
| CN | 107491813 A | | 12/2017 | |
| EP | 3032780 A | | 6/2016 | |
| JP | 2009015834 A | * | 1/2009 | G06F 16/9535 |
| JP | 2015079395 A | | 4/2015 | |
| KR | 20160064447 A | | 6/2016 | |
| RU | 2368006 C1 | | 9/2009 | |
| RU | 2419858 C2 | | 5/2011 | |
| RU | 2451986 C2 | | 11/2011 | |
| RU | 2509341 C2 | | 3/2014 | |
| RU | 2523930 C2 | | 7/2014 | |
| RU | 2013101601 A | | 7/2014 | |
| RU | 2543315 C2 | | 2/2015 | |
| RU | 2577193 C2 | | 3/2016 | |
| WO | 2002052374 A2 | | 7/2002 | |
| WO | WO-2009087414 A1 | * | 7/2009 | G06F 16/957 |
| WO | 2013010698 A1 | | 1/2013 | |
| WO | 13189738 A1 | | 12/2013 | |
| WO | 14141078 A1 | | 9/2014 | |

OTHER PUBLICATIONS

English Abstract for CN105893398 retrieved on Espacenet on May 7, 2018.

English Abstract for CN106446195 retrieved on Espacenet on May 7, 2018.

English Abstract for KR20160064447 retrieved on Espacenet on May 7, 2018.

(56) References Cited

OTHER PUBLICATIONS

English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
Youtube Account: RnStore, "Zmags Demo", (May 19, 2011), times stamp 1:54/3:56, 2:20/3:56, PDF Attached, URL: https://www.youtube.com/watch?v=AsBrLdoEJgA, received from USPTO on May 11, 2018 with regard to the U.S. Appl. No. 15/263,493.
Youtube Account: iappletech128, "Close Tabs in Safari by Swiping", (Oct. 20, 2013), time stamp 0:20-0:35/1:18, PDF Attached, URL: https://www.youtube.com/watch?v=V8TTbYrFSmg, received from USPTO on May 11, 2018 with regard to the U.S. Appl. No. 15/263,493.
Youtube Account: macmostvideo, "Viewing Photos With the Finder (MacMost Now 612)", (Sep. 30, 2011), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
Extended European Search Report from ER16190997, dated Feb. 16, 2017, Herry, Tzvetanka.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
SAMS, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Russian Search Report from RU patent application No. 2015141108 dated Sep. 7, 2016.
European Search report from EP 16185747, SIODMOK, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), CAISE, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/607,555, filed May 29, 2017.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
Extended European Search Report from EP16190997, dated Feb. 16, 2017, Herry, Tzvetanka.
Office Action with regard to the counterpart U.S. Appl. No. 15263493 dated Sep. 20, 2018.
Office Action with regard to the counterpart U.S. Appl. No. 15236538 dated Sep. 28, 2018.
European Examination Report with regard to the counterpart patent application No. EP 16190999.9 dated Jun. 29, 2018.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (Notice of Allowance with regard to the counterpart U.S. Appl. No. 15/592,745 dated Oct. 11, 2018).
Office Action with regard to the counterpart U.S. Appl. No. 15/263,493 dated Nov. 29, 2018.
Office Action with regard to the counterpart U.S. Appl. No. 15/606,326 dated Dec. 19, 2018.
Office Action with regard to the counterpart U.S. Appl. No. 15/592,745 dated Mar. 8, 2019.
Office Action with regard to the counterpart U.S. Appl. No. 15/262,318 dated Apr. 1, 2019.

(56) References Cited

OTHER PUBLICATIONS

Office Action with regard to the counterpart U.S. Appl. No. 15/263,493 dated May 9, 2019.
Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.

\* cited by examiner

|  | 325 | 311 | 312 | 313 | 314 | 315 | 316 |
|---|---|---|---|---|---|---|---|
|  | RANK | Q1 | Q2 | Q3 | Q4 | Q5 | Q6 |
| 310 | 1ST | I2 | I3 | I9 | I2 | I1 | I2 |
|  | 2ND | I3 | I1 | I8 | I8 | I3 | I3 |
|  | 3RD | I1 | I2 | I3 | I7 | I9 | I1 |
|  | 4TH | I7 | I6 | I7 | I3 | I8 | I6 |
|  | 5TH | I6 | I7 | I6 | I9 | I7 | I9 |
| 340 | 6TH | I9 | I8 | I1 | I5 | I4 | I7 |
|  | 7TH | I8 | I9 | I2 | I10 | I5 | I10 |
|  | 8TH | I10 | I10 | I10 | I4 | I6 | I5 |
|  | 9TH | I5 | I5 | I4 | I1 | I2 | I4 |
|  | 10TH | I4 | I4 | I5 | I6 | I10 | I8 |

METHOD AND APPARATUS FOR GENERATING A RECOMMENDED SET OF ITEMS

CROSS-REFERENCE

The present application claims priority to Russian Patent Application No. 2015141110, filed Sep. 28, 2015, entitled "METHOD AND APPARATUS FOR GENERATING A RECOMMENDED SET OF ITEMS", the entirety of which is incorporated herein by reference.

FIELD

The present technology relates to search engines in general and specifically to a method and apparatus for generating a recommended set of items.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the tanked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD recommending system, which system aggregates and recommends content from various social networks. The FLIPBOARD recommending system presents the uncovered content in a "magazine style" format, where the user can "flip" through the pages with the recommended/aggregated content. The recommending system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

In order to generate the ranked search results in a search engine system or a list of recommended resources in a typical recommending system, the respective system utilizes a machine learning algorithm to select search results and/or recommended content. There are several machine learning algorithms known in the art and utilized by search engines and/or recommendation systems. As is known, a typical machine learning algorithm is first "trained" using a training set (whether marked or unmarked) to generate a machine learning algorithm formula, which is then applied to determine at run time for generating an output based on the system inputs.

SUMMARY

Developers of the present technology have appreciated certain technical drawbacks associated with the existing recommendation systems. Some conventional recommendation systems usually require a considerable amount of time to produce relevant content recommendations. Other recommendation systems may furnish content recommendations in an acceptable amount of time but the content recommendations may not be very relevant to a particular user. It is an object of the present technology to ameliorate at least some of the inconveniences present in the prior art.

According to one aspect of the present technology, there is provided a method of generating a recommended subset of items for a user of an electronic device, wherein the method is executed at a server. The method comprises: acquiring, by the server, user events associated with a plurality of users, wherein the user events comprise indications of user queries associated with the plurality of users; for each of the user queries, generating, by the server, a ranked predicted items list that comprises at least some items from a set of potentially recommendable items such that each particular item within the ranked predicted items list has an associated rank; for each item within a plurality of ranked predicted items lists, generating, by the server, an item score based on a totality of ranks associated therewith; acquiring, by the server, a request for the recommended subset of items; and generating, by the server, the recommended subset of items from the set of potentially recommendable items, wherein the generating the recommended subset of items comprises selecting, by the server, at least one item within the plurality of ranked predicted items lists as the recommended subset of items based on the item scores of the items within the plurality of ranked predicted items lists.

In some implementations of the method, each ranked predicted items list is associated with a respective user query.

In some implementations of the method, each indication of the user query comprises a respective user query context.

In some implementations of the method, the generating the plurality of ranked predicted items lists comprises, for each ranked predicted items list: inputting, by the server, the respective user query and the user query context into a ranking model algorithm; and inputting, by the server, the items from the set of potentially recommendable items into the ranking model algorithm.

In some implementations of the method, the generating the plurality of ranked predicted items lists further comprises, for each ranked predicted items list, retrieving by the server, from the ranking model algorithm a potential predicted items list comprising the items from the set of potentially recommendable items, wherein each item is ranked within the potential ranked predicted items list.

In some implementations of the method, the generating the plurality of ranked predicted items lists further comprises, for each ranked predicted items list, determining by the server, the ranked predicted items list based on the potential ranked predicted items list, wherein the determining the ranked predicted items list comprises truncating, by the server, the potential ranked predicted items list based on a list threshold. The list threshold is a maximum number of items within the ranked predicted items list.

In some implementations of the method, the generating the recommended subset of items comprises ranking, by the server, the at least one item within the recommended subset of items based on the respective item scores.

In some implementations of the method, the ranking the at least one item within the recommended subset of items is further based on the respectively associated ranks of the at least one item.

In some implementations of the method, the ranking the at least one item within the recommended subset of items is based on the respective item scores and the respectively associated ranks comprises determining, by the server, a respective average associated rank for items within the at least one item having a same item score.

In some implementations of the method, the method further comprises sending, by the server, a signal to the electronic device for displaying the recommended subset of items to the user.

In some implementations of the method, the generating the recommended subset of items from the set of potentially recommendable items is executed prior to the acquiring the request for the recommended subset of items.

In some implementations of the method, the generating the recommended subset of items from the set of potentially recommendable items is executed in an offline mode.

In some implementations of the method, the generating the recommended subset of items from the set of potentially recommendable items is executed in real-time.

In another aspect of the present technology, there is provided a server comprising a processing module and a database for generating a recommended subset of items for a user of an electronic device. The processing module being configured to: acquire user events associated with a plurality of users, wherein the user events comprise indications of user queries associated with the plurality of users; for each of the user queries, generate a ranked predicted items list that comprises at least some items from a set of potentially recommendable items such that each particular item within the ranked predicted items list has an associated rank; for each item within a plurality of ranked predicted items lists, generate an item score based on a totality of ranks associated therewith; acquire a request for the recommended subset of items; and generate, the recommended subset of items from the set of potentially recommendable items, wherein to generate the recommended subset of items the processing module is configured to select at least one item within the plurality of ranked predicted items lists as the recommended subset of items based on the item scores of the items within the plurality of ranked predicted items lists.

In some implementations of the server, each ranked predicted items list is associated with a respective user query.

In some implementations of the server, each indication of the user query comprises a respective user query context.

In some implementations of the server, to generate the plurality of ranked predicted items lists the processing module is configured to, for each ranked predicted items list: input the respective user query and the user query context into a ranking model algorithm; and input the items from the set of potentially recommendable items into the ranking model algorithm.

In some implementations of the server, to generate the plurality of ranked predicted items lists the processing module is further configured, for each ranked predicted items list, to retrieve from the ranking model algorithm a potential predicted items list the items from the set of potentially recommendable items, wherein each item is ranked within the potential ranked predicted items list.

In some implementations of the server, to generate the plurality of ranked predicted items lists the processing module is further configured, for each ranked predicted items list, to determine the ranked predicted items list based on the potential ranked predicted items list, wherein to determine the ranked predicted items list the processing module is configured to truncate the potential ranked predicted items list based on a list threshold. The list threshold is a maximum number of items within the ranked predicted items list.

In some implementations of the server, to generate the recommended subset of items the processing module is configured to rank the at least one item within the recommended subset of items based on the respective item scores.

In some implementations of the server, to rank the at least one item within the recommended subset of items, the processing module being configured to rank based on the respectively associated ranks of the at least one item.

In some implementations of the server, the processing module is configured to rank the at least one item within the recommended subset of items based on the respective item scores and the respectively associated ranks, the processing module being further configured to determine a respective average associated rank for items within the at least one item having a same item score.

In some implementations of the server, the processing module is further configured to send a signal to the electronic device for displaying the recommended subset of items to the user.

In some implementations of the server, the processing module is configured to generate the recommended subset of items from the set of potentially recommendable items prior to the server being configured to acquire the request for the recommended subset of items.

In some implementations of the server, the processing module is configured to generate the recommended subset of items from the set of potentially recommendable items in an offline mode.

In some implementations of the server, the processing module is configured to generate the recommended subset of items from the set of potentially recommendable items in real-time.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 depicts generation of the ranked predicted items lists by a processing module of the system of the FIG. 1.

DETAILED DESCRIPTION

Figure 1:
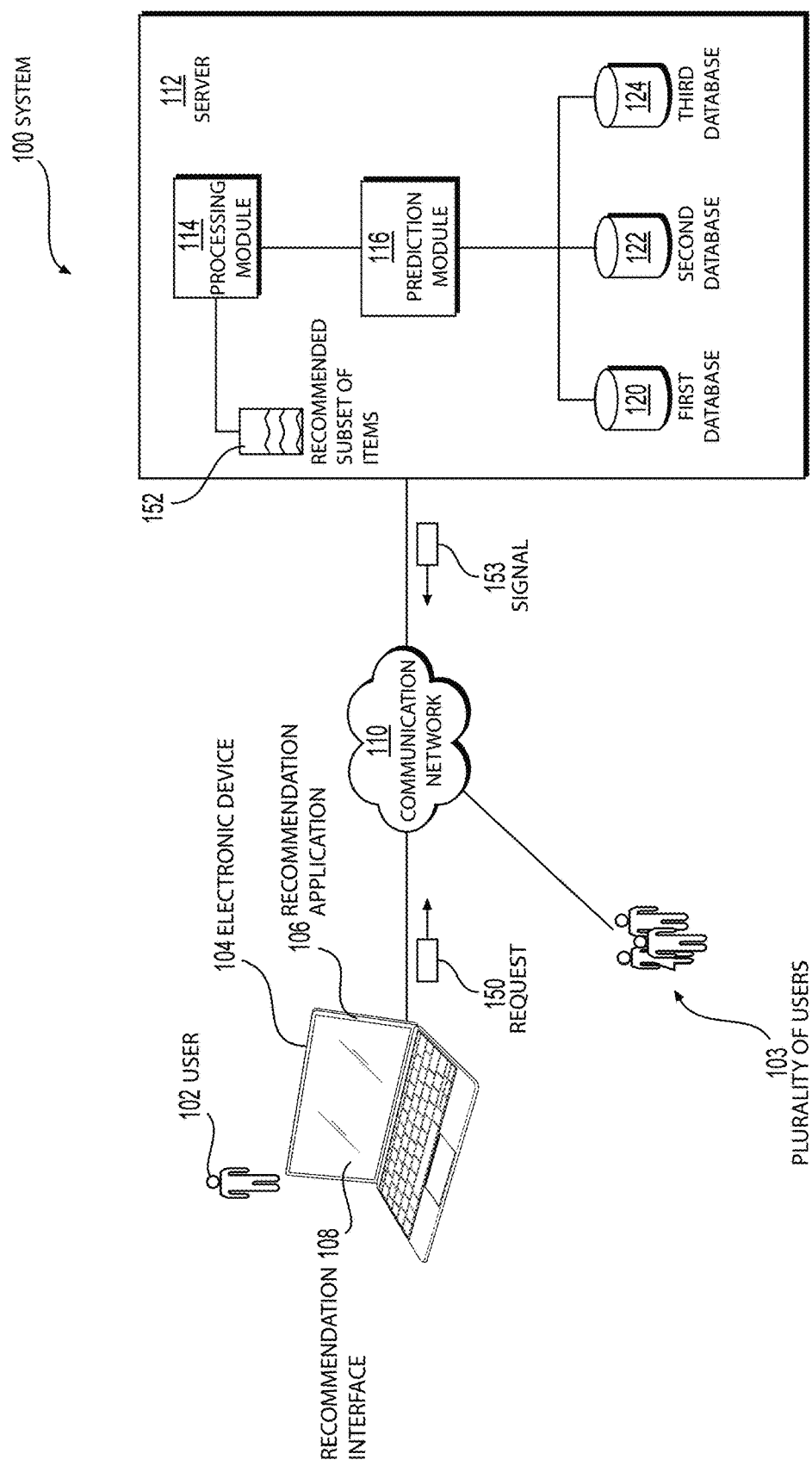
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. In some embodiments, the user 102 may be a new subscriber to a recommendation service provided by the system 100. However, the subscription does not need to be express or paid for. For example, the user 102 can become a new subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100"). However, embodiments of the present technology can be equally applied to other types of the systems 100, as will be described in greater detail herein below.

In some embodiments, the system 100 may have provided content recommendations to a plurality of users 103 of the system 100. The plurality of users 103 may be existing subscribers to the recommendation service provided by the system 100. However, the subscription does not need to be express or paid for. The plurality of users 103 may have submitted user queries to a search engine (not depicted). In other embodiments, a provider of the recommendation service of the system 100 may also be a provider of the search engine. In additional embodiments, the provider of the recommendation service of the system 100 may be different from the provider of the search engine.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include the user 102 accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means.

Figure 4:
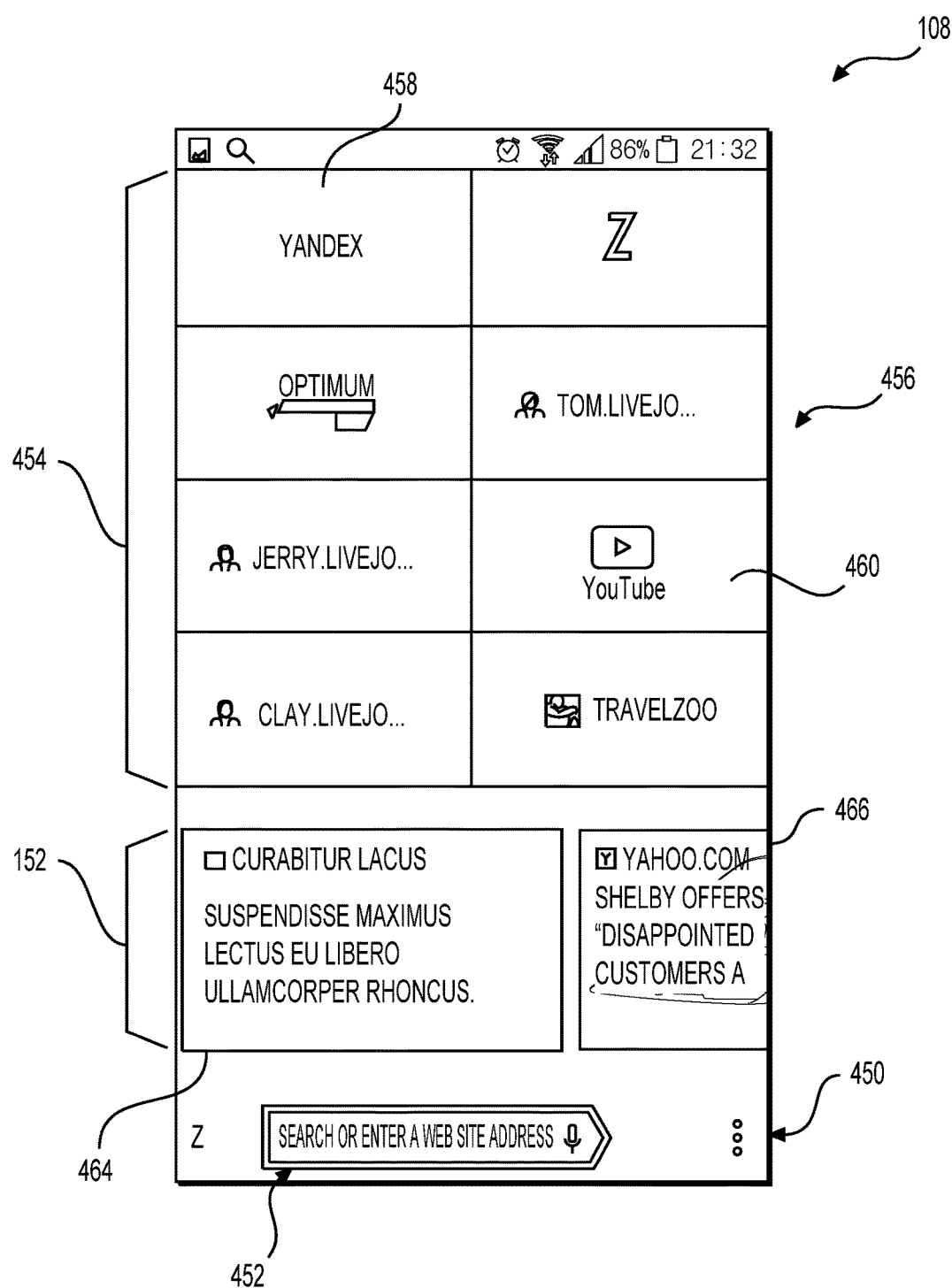
FIG. 4 depicts a screen shot of a recommendation interface implemented in accordance to one non-limiting embodiment of the present technology, the recommendation interface generated on an electronic device associated with a user of the system of FIG. 1.

Generally speaking, the recommendation application 106 comprises a recommendation interface 108, the recommendation interface 108 being displayed on a screen (not separately numbered) of the electronic device 104. With reference to FIG. 4, there is depicted a screen shot of the recommendation interface 108 implemented in accordance to one non-limiting embodiment of the present technology. In some embodiments of the present technology the recommendation interface 108 is actuated when the user 102 of the electronic device 104 actuates (i.e. executes, run, background-run or the like) the recommendation application 106. Alternatively, the recommendation interface 108 can be actuated when the user 102 opens a new browser window and/or activates a new tab in the browser application.

The recommendation interface 108 includes a search interface 450. The search interface 450 includes a search query interface 452. The search query interface 452 can be implemented as an "omnibox" which allows entry of a search query for executing a search or a network address (such as a Universal Remote Locator) for identifying a network resource (such as a web site) to be accessed.

The recommendation interface 108 further includes a links interface 454. The links interface 454 includes a plurality of actuators 456, each of the plurality of actuators 456 having a link to either (i) a web site marked as "favourite" or otherwise marked by the user 102, (ii) a previously visited web site or (iii) the like. The plurality of actuators 456, in the depicted embodiment, is visually presented to the user 102 as square buttons with a logo and/or a name of the resource depicted therein, the logo and the name for enabling the user 102 to identify which resource the particular one of the plurality of actuators 456 is linked to. However, it should be expressly understood that the visual representation of some or all of the plurality of actuators 456 can be different. As such, some or all of the plurality of actuators 456 can be implemented as differently shaped buttons, as hyperlinks presented in a list or the like.

As an example, the plurality of actuators 456 includes inter alia a first actuator 458 and a second actuator 460. The first actuator 458 can be associated with a link to Yandex™ search engine and, to that end, the first actuator 458 has the Yandex search engine logo depicted therein and may be associated with a hyperlink to Yandex™ website, for example. The second actuator 460 can be associated with a link to Youtube™ video sharing service and, to that end, the first actuator 458 has YouTube video sharing logo depicted therein and may be associated with a hyperlink to Youtube™ website, for example. Needless to say, the number and content of the individual ones of the plurality of actuators 456 is not particularly limited.

The recommendation interface 108 further includes a recommended subset of items 152. The recommended subset of items 152 includes one or more recommended items, such as a first recommended item 464 and a second recommended item 466. Naturally, the recommended subset of items 152 can have more (or fewer) than the two items (the first recommended item 464 and the second recommended item 466). Within the embodiment depicted in FIG. 4 and in those embodiments where more than one recommended item are present, the user 102 can scroll through the recommended subset of items 152. The scrolling can be achieved by any suitable means. For example, the user 102 can scroll through the recommended items of the recommended subset of items 152 by means of actuating a mouse device (not depicted), a key board key (not depicted) or interacting with a touch sensitive screen (not depicted) of or associated with the electronic device 104. In the depicted embodiment of FIG. 4, the user 102 can scroll through the recommended items (i.e. through the first recommended item 464 and the second recommended item 466, as well as other recommended content items potentially present in the recommended subset of items 152) by executing right to left or left to right swipe (or mouse scroll or a key board scroll) action. However, it should be noted that in alternative embodiments, the scrolling through the recommended items can be done in a vertical direction or any other suitable direction.

How the content for the recommended subset of items 152 is generated will be described in greater detail herein below.

The recommendation interface 108 of FIG. 4 can be thought of as "an overview recommendation screen" in a sense that it provides an overview of recommended items alongside with other content and/or interfaces. More specifically, in the illustrated embodiment, the recommended subset of items 152 (which allows the user 102 to explore items that the user 102 does not even know that she/he may be interested in) is presented together with the plurality of actuators 456 (which allows the user 102 to explore the items the user 102 marked as interesting), as well as the search interface 450 (which allows the user 102 to search for resources and/or access resources, such as those resources available on the Internet and the like).

Figure 5:
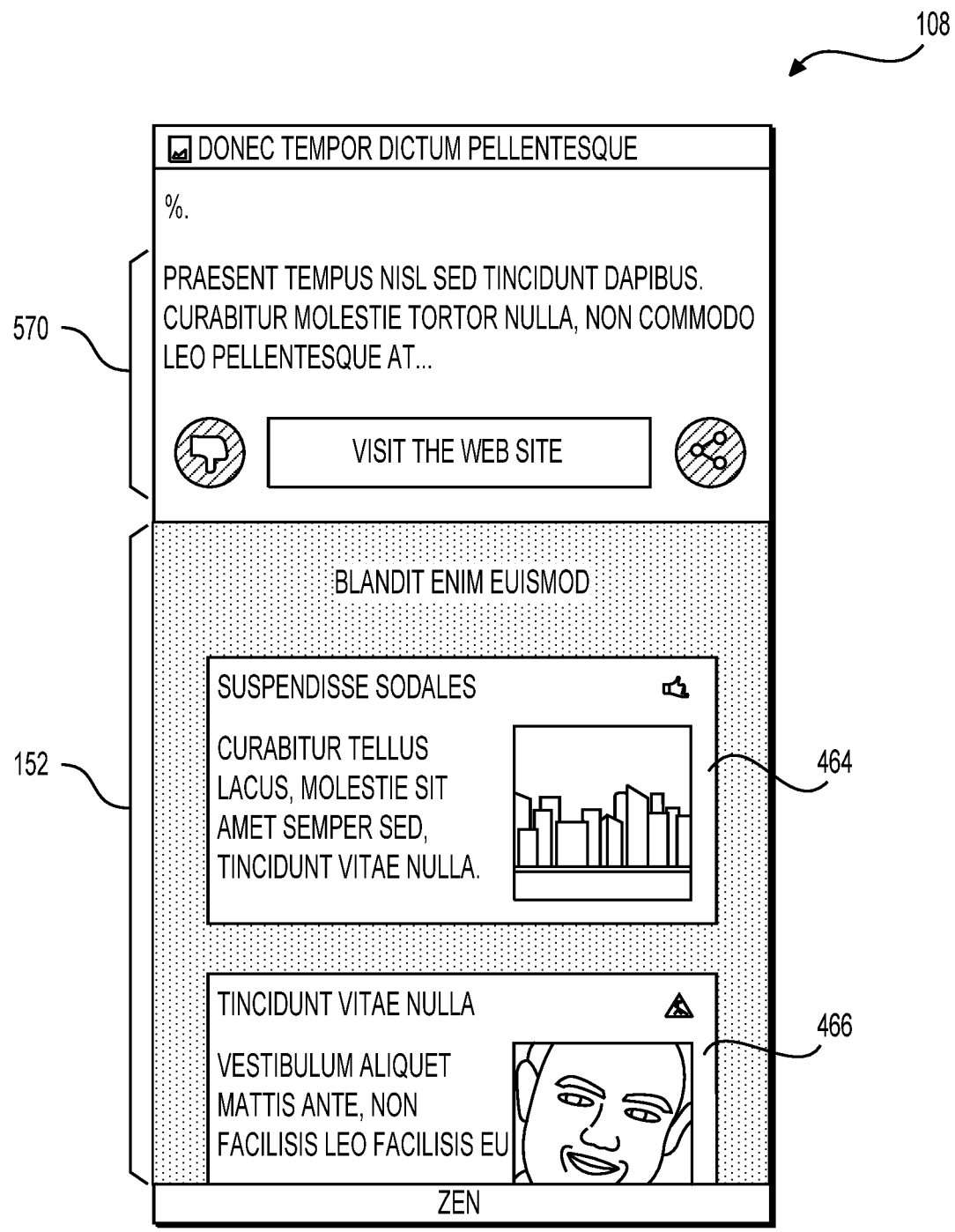
FIG. 5 depicts a screen shot of a recommendation interface implemented in accordance to other non-limiting embodiment of the present technology, the recommendation interface generated on the electronic device associated with a user of the system of FIG. 1.

With reference to FIG. 5, the recommendation interface 108 is depicted in a "recommended items" variation thereof. More specifically, the recommendation interface 108 depicted in FIG. 5 comprises the aforementioned recommended subset of items 152 that includes the first recommended item 464 and the second recommended item 466 (the content thereof being different from that depicted in FIG. 4). In addition to the recommended subset of items 152, the recommendation interface 108 of FIG. 5 further includes a highlighted recommended item 570, which can be the most relevant/interesting recommended item for the user 102 as selected by a processing module 114 (to be described herein below).

As one will appreciate, the recommendation interface 108 of FIG. 5 does not include elements that are akin to the plurality of actuators 456 or the search interface 450. Thus, the recommended items variation of the recommendation interface 108 allows the user 102 to browse the recommended items without being "distracted" by other items (such as favourite links, search interfaces and the like).

Figure 6:
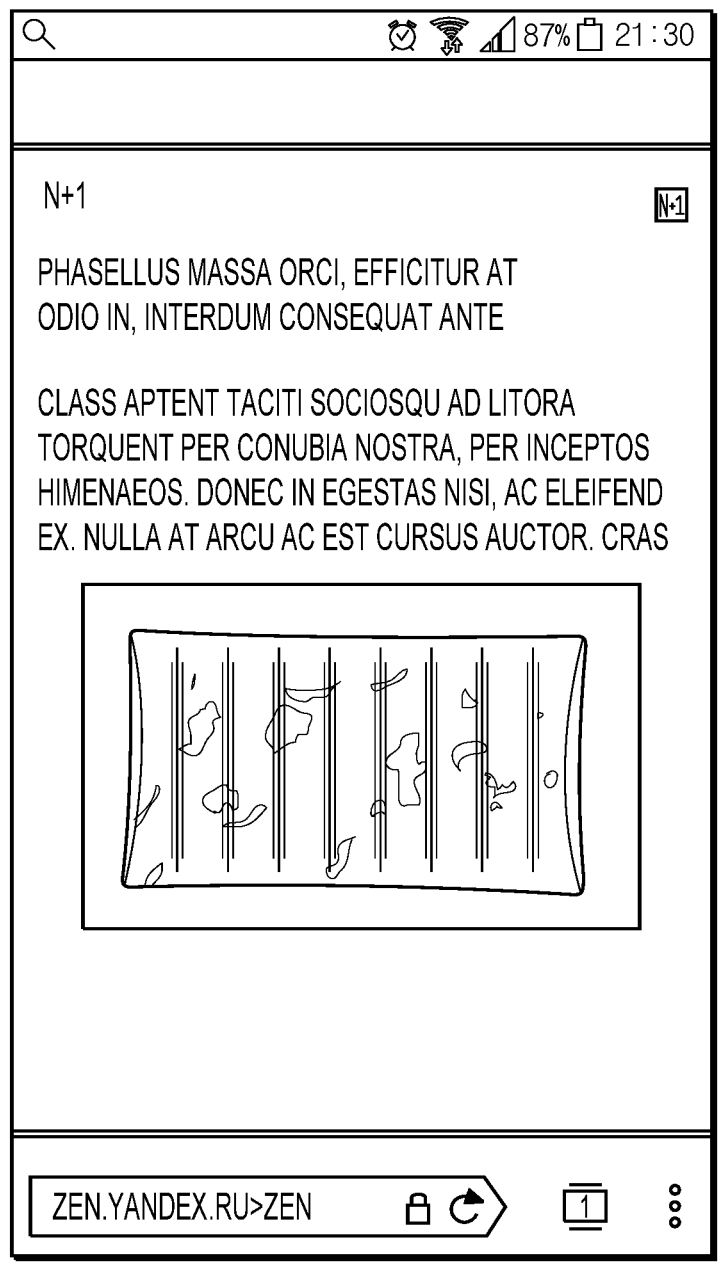
FIG. 6 depicts a screen shot of a recommendation interface implemented in accordance to yet another non-limiting embodiment of the present technology, the recommendation interface generated on the electronic device associated with a user of the system of FIG. 1.

Finally, with reference to FIG. 6, the recommendation interface 108 is depicted in a "recommended item view" configuration. Within the illustration of FIG. 6, the recommendation interface 108 displays a single recommended item 672. The recommended item view allows the user 102 to peruse individual recommended items (such as the content of the single recommended item 672 depicted in FIG. 6).

It is noted that the transition between the views of the recommendation interface 108 between that illustrated in FIG. 4, FIG. 5 and FIG. 6 may be triggered upon user 102 executing a particular action. For example after being presented with the recommendation interface 108 of FIG. 4, upon user clicking in the area generally associated with the recommended subset of items 152, the electronic device 104 may change presentation of the recommendation interface 108 of FIG. 4 to that of FIG. 5. By the same token, upon the user 102 clicking (or otherwise actuating) a specific one of the recommended subset of items 152 displayed within the recommendation interface 108 of FIG. 5, the electronic device 104 may change presentation of the recommendation interface 108 of FIG. 4 to that of FIG. 5.

Returning to the description of FIG. 1, the electronic device 104 is communicatively coupled to a communication network 110 for accessing a server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

The server 112 comprises the processing module 114. The processing module 114 is operatively coupled to a prediction module 116. The processing module 114 has access to a first database 120, a second database 122 and a third database 124. In the depicted embodiment, the processing module 114 has access to the first database 120, the second database 122 and the third database 124 via the prediction module 116. However, in alternative embodiments, the processing module 114 can have direct access to some or all of the first database 120, the second database 122 and the third database 124.

Furthermore, in the depicted illustration the first database 120, the second database 122 and the third database 124 are depicted as separate physical entities. This does not need to be so in each and every embodiment of the present technology. As such, some or all of the first database 120, the second database 122 and the third database 124 may be implemented in a single database. Furthermore, any one of the first database 120, the second database 122 and the third database 124 may, in itself, be split into several distributed storages.

By the same token, the processing module 114 and the prediction module 116 are depicted as separate physical entities. This does not need to be so in each and every embodiments of the present technology. As such, some or all of t the processing module 114 and the prediction module 116 may be implemented in a single hardware apparatus. Furthermore, any one of the processing module 114 and the prediction module 116 may, in itself, be split into several distributed hardware apparatuses.

By the same token, all (or any combination of) of the processing module 114, the prediction module 116, the first database 120, the second database 122 and the third database 124 may be implemented in a single hardware apparatus.

The functions of various components of the server 112 will be described in greater details.

The processing module 114 is configured to (i) receive from the electronic device 104 a request 150 for the recommended subset of items 152 and (ii) responsive to the request 150, to generate the recommended subset of items 152 customized for the user 102 associated with the electronic device 104. The processing module 114 may further coordinate execution of various routines described herein as performed by the prediction module 116, as well as the first database 120, the second database 122 and the third database 124.

In some embodiments of the present technology, the request 150 may be generated in response to the user 102 providing an explicit indication of the user desire to receive the recommended subset of items 152. For example, the aforementioned recommendation interface 108 can provide a button (or another actuatable element) to enable the user 102 to indicate her/his desire to receive a new or an updated recommended subset of items. As a non-limiting example, the recommendation interface 108 can provide an actuatable button that reads "Request a content recommendation". Within these embodiments, the request 150 for the recommended subset of items 152 can be thought of as "an explicit request" in a sense of the user 102 expressly providing a request for the recommended subset of items 152.

In other embodiments, the request 150 can be generated in response to the user 102 providing an implicit indication of the user desire to receive the recommended subset of items 152. In some embodiments of the present technology, the request 150 can be generated in response to the user 102 starting the recommendation application 106.

In yet further embodiments of the present technology, the request 150 can be generated even without the user 102 providing either explicit or implicit indication of the user desire to receive the recommended subset of items 152. For example, in those embodiments of the present technology where the recommendation application 106 is implemented as a browser (for example, a GOOGLE™ browser, a YANDEX™ browser, a YAHOO!™ browser or any other proprietary or commercially available browser application), the request 150 can be generated in response to the user 102 opening the browser application and can be generated, for example, without the user 102 executing any additional actions other than activating the browser application. As another example, the request 150 can be generated in response to the user 102 opening a new tab of the already-opened browser application and can be generated, for example, without the user 102 executing any additional actions other than activating the new browser tab. In other words, the request 150 can be generated even without the user 102 knowing that the user 102 may be interested in obtaining the recommended subset of items 152.

As another example, the request 150 may be generated in response to the user 102 selecting a particular element of the browser application and can be generated, for example, without the user 102 executing any additional actions other than selecting/activating the particular element of the browser application.

Examples of the particular element of the browser application include but are not limited to:

An address line of the browser application bar

A search bar of the browser application and/or a search bar of a search engine web site accessed in the browser application An omnibox (combined address and search bar of the browser application)

A favourites or recently visited network resources pane

Any other pre-determined area of the browser application interface or a web resource displayed in the browser application In some embodiments of the present technology, the prediction module 116 may execute a machine learning algorithm. For example, the prediction module 116 can execute any suitable supervised machine learning algorithm, such as but not limited to:

Artificial neural network

Bayesian statistics

Gaussian process regression

Decision trees

And the like

Figure 2:
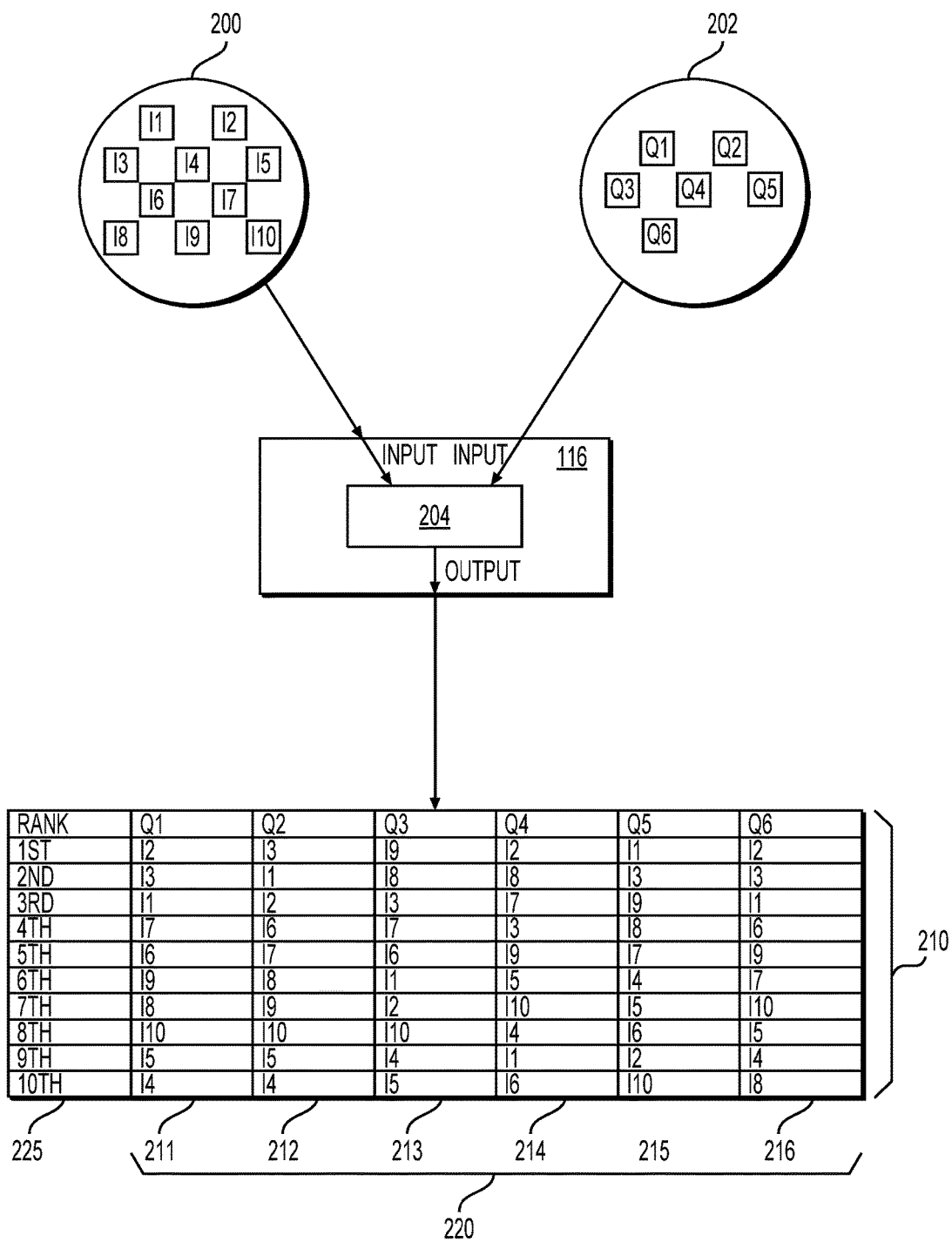
FIG. 2 depicts inputs into and outputs from a prediction module of the system of FIG. 1.

In some embodiments of the present technology, with reference to FIG. 2, the prediction module 116 may generate a table 210 comprising a plurality of potential ranked predicted items lists 220 and an associated rank column 225. In this case, the plurality of potential ranked predicted items lists 220 may comprise potential ranked items lists 211, 212, 213, 214, 215 and 216.

It is noted that in those embodiments where the prediction module 116 implements the machine learning algorithm, the prediction module 116 may comprise a ranking model algorithm 204. The ranking model algorithm 204 may be previously trained using a set of training data for generating the table 210. For example, the set of training data may comprise training subsets of potentially recommendable items and training subsets of user queries for items within the training subsets of potentially recommendable items. Each user query within the training subsets of user queries may comprise a respective query context.

The first database 120 is configured to store module information. The module information may comprise information stored thereon by the processing module 114 and/or the prediction module 116.

The second database 122 is configured to store information related to a set of potentially recommendable items 200, depicted in FIG. 2. The nature of one or more items within the set of potentially recommendable items 200 is not particularly limited. Some examples of the one or more potentially recommendable items include but are not limited to:

- A news item
- A publication
- A web resource
- A post on a social media web site
- A new item to be downloaded from an application store
- A new song (music track) to play/download on a content hosting resource
- A new movie (video clip) to play/download on a content hosting resource
- A new document uploaded for viewing on a social media web site (such as a new photo uploaded to an INSTRAGRAM or FACEBOOK account)

The third database 124 is configured to store information related to user events (associated with the plurality of users 103 of the system 100). Naturally, the user events can be stored in an encrypted form. Examples of the user events include but are not limited to:

- A given user from the plurality of users 103 submitted a given user query;
- An indication of the given user query submitted by the given user from the plurality of users 103;
- An indication of a given query context associated with the given user query—a date on which the given user query was submitted, a time during which the given user query was submitted, a location from which the given user query was submitted and the like;
- The given user listening to a particular music track following the given submitted user query;
- The given user "liking" the particular music track, an album associate with the particular music track and/or an artist performing the particular music track following the given submitted user query;
- The given user was presented with a particular resource as part of the recommended content set furnished following the given submitted user query;
- The given user has clicked on (or otherwise selected) the particular resource that was recommended as part of a recommended set of items furnished following the given submitted user query;
- The given user has purchased/ordered/downloaded a particular item from a web resource following the given submitted user query.

It should be expressly understood that the user events may take many forms and are not specifically limited. As such, above presented lists of non-limiting examples of the way that the user events may be implemented are just examples thereof. As such, it should be expressly understood that many other alternative implementations of the user events may be contemplated in different implementations of the present technology.

How information is obtained and stored in the first database 120, the second database 122 and the third database 124 is not particular limited. Some example implementations will be outlined herein below.

For example, the information related to the set of potentially recommendable items 200 may be obtained from a particular service that maintains a list of existing and/or newly available items (for example, on-line media streaming resources, on-line media downloading resources, etc), from social media networks that the user 102 (and/or the plurality of users 103) subscribed to, news resources and the like; and stored in the second database 122.

For example, the information related to the user events may be obtained from the particular service that maintains information about various items available therefrom and user interactions of the plurality of users 103 with the various items, user search logs of the plurality of users 103, user logs of the plurality of users 103 associated with user interactions with the particular service, user browser logs of the plurality of users 103 and the like; and stored in the third database 124. The information related to the user events may be stored in an encrypted form.

In some embodiments of the present technology, the processing module 114 and the prediction module 116 may be configured to perform various routines described herein below for executing different functionalities of the present technology.

In some embodiments, the prediction module 116 may be configured to acquire the user events associated with the plurality of users 103. As mentioned above, the user events may comprise the indications of user queries associated with the plurality of users 103. In other embodiments, each indication of the user query associated with the plurality of users 103 may comprise the respective user query context.

In other embodiments of the present technology, the prediction module 116 may be configured to generate the plurality of potential ranked predicted items lists 220 depicted in FIG. 2. To this end, the prediction module 116 may retrieve the set of potentially recommendable items 200 from the second database 122. In this case, the set of potentially recommendable items 200 may comprise ten items I1, I2, I3, I4, I5, I6, I7, I8, I9 and I10. In some implementations of the present technology, the set of potentially recommendable items 200 may comprise 1000, 5000, 100000 or 900000 items, for example. It should be noted that the set of potentially recommendable items 200 comprising the ten items is illustrated for ease of explanation only and that the set of potentially recommendable items 200 may comprise more (or fewer) items than the ten items depicted in FIG. 2.

The prediction module 116 may retrieve the user events stored in the third database 124 which comprise the indications of user queries within a set of user queries 202, wherein the user queries may be associated with the plurality of users 103. In this case, the set of user queries 202 may comprise six user queries Q1, Q2, Q3, Q4, Q5 and Q6. In other implementations of the present technology, the set of user queries 202 may comprise 10000, 50000, 150000 or 500000 user queries, for example. It should be noted that the set of user queries 202 comprising the six user queries is illustrated for ease of explanation only and that the set of user queries 202 may comprise more (or fewer) user queries than the six user queries depicted in FIG. 2.

In some embodiments, the set of user queries 202 may comprise only a portion of the user queries associated with the plurality of users 103. The prediction module 116 may retrieve the user events stored in the third database 124 which comprise the indications of user queries within the set of user queries 202 and a user query contexts respectively associated to the user queries within the set of user queries 202. For example, the user query contexts may be respective dates of the user queries within the set of user queries 202, respective times of the user queries within the set of user queries 202, respective geo-locations from which the user queries within the set of user queries 202 originated and the like.

The prediction module 116 may be configured to input the items from the set of potentially recommendable items 200 into the ranking model algorithm 204. In other words, the prediction module 116 may be configured to input the items I1, I2, I3, I4, I5, I6, I7, I8, I9 and I10 into the ranking model algorithm 204. The prediction module 116 may also be configured to input the set of user queries 202 as well as the respectively associated user query contexts into the ranking model algorithm 204. In other words, the prediction module 116 may be configured to input the queries Q1, Q2, Q3, Q4, Q5 and Q6 as well as their respectively associated user query contexts into the ranking model algorithm 204. As a result, the ranking model algorithm 204 may output the table 210.

The table 210 may comprise the potential ranked predicted items lists 211, 212, 213, 214, 215 and 216 which are respectively associated with the user queries Q1, Q2, Q3, Q4, Q5 and Q6 and their respectively associated user query contexts. Each potential ranked predicted items list may comprise the items I1, I2, I3, I4, I5, I6, I7, I8, I9 and I10 from the set of potentially recommendable items 200. Each of the items I1, I2, I3, I4, I5, I6, I7, I8, I9 and I10 may be ranked within each potential predicted items list by the ranking model algorithm 204. In other words, the ranking model algorithm 204 may be configured to output for each user query within the set of user queries 202 a ranked prediction of the items within the set of potentially recommendable items 200 based on how relevant each item within the set of potentially recommendable items 200 may be for the respective query and the respectively associated user query context.

For example, the item I2 may be predicted by the ranking model algorithm 204 to be a most relevant item within the set of potentially recommendable items 200 for the user queries Q1, Q4, Q6 and their respectively associated user query contexts. In other words, the item I2 may have an associated rank of "1" within the potential ranked predicted items lists 211, 213, and 216. In another example, the item I4 may be predicted by the ranking model algorithm 204 to be a most irrelevant item within the set of potentially recommendable items 200 for the user queries Q1, Q2 and their respectively associated user query contexts. In other words, the item I2 may have the associated rank of "10" within the potential ranked predicted items lists 211 and 212.

In some embodiments of the present technology, the processing module 114 may be configured to retrieve from the ranking model algorithm 204 within the prediction module 116 the table 210. In other words, the processing module 114 may retrieve the plurality of potential ranked predicted items lists 220, wherein each potential ranked predicted items list comprises the items from the set of potentially recommendable items 200 and wherein each item is ranked within each potential ranked predicted items list. The processing module 114 may also retrieve the associated ranks of the items within each potential ranked predicted items list within the plurality of potential ranked predicted items lists 220. In other embodiments, the processing module 114 or the prediction module 116 may further store the table 210 as part of the module information within the first database 120.

In alternative embodiments, with reference to FIG. 3, the processing module 116 may be configured to determine ranked predicted items lists 311, 312, 313, 314, 315 and 316 based on the respective potential ranked predicted items lists 211, 212, 213, 214, 215 and 216. To this end, the processing module 116 may be configured to truncate each potential ranked predicted items list within the plurality of potential ranked predicted items lists 220 based on a list threshold 330. The list threshold 330 may be a maximum number of items within each ranked predicted items list within a plurality of ranked predicted items lists 320. In this case, the maximum number of items within each ranked predicted items list may be five items. Therefore, the processing module 114 may be configured to truncate each potential ranked predicted items list within the plurality of potential ranked predicted items lists 220 after an item with the associated rank of "5" within each potential ranked predicted items list. In other implementations of the present technology, the maximum number of items within each ranked predicted items list may be a 100 items, for example. It should be noted that the maximum number of items within each ranked predicted items list may be higher (or lower) than the maximum number of items depicted in FIG. 3.

As a result, the table 210 may be truncated into a table 310 and a truncated part 340 of the table 210. As mentioned above, the table 310 comprises the ranked predicted items lists 311, 312, 313, 314, 315 and 316. The table 310 may also comprise an associated rank column 325. This means that the processing module 114 may be configured to generate for each of the user queries Q1, Q2, Q3, Q4, Q5 and Q6 within the set of user queries 202 the respectively associated ranked predicted items list that comprises at least some items from the set of potentially recommendable items 200. In other words, the ranked predicted items lists 311, 312, 313, 314, 315 and 316 are associated with the user queries Q1, Q2, Q3, Q4, Q5 and Q6, respectively. In some embodiments, the processing module 114 may store the table 310 in the first database 120 as part of the module information.

Moreover, each item within each ranked predicted items list has the respective associated rank within each ranked predicted items lists. For example, the item I9 has the associated rank of "5" within the ranked predicted items list 314 associated with the user query Q4. In another example, the item I9 has the associated rank of "3" within the ranked predicted items list 315 associated with the user query Q5. In an additional example, the item I9 has the associated rank of "5" within the ranked predicted items list 316 associated with the user query Q6.

In some embodiments of the present technology, the processing module 114 may be configured to generate for each item within the plurality of ranked predicted items lists 320 an item score based on a totality of ranks associated therewith. In this case, the processing module 114 may determine that the plurality of ranked predicted items lists 320 comprise the items I1, I2, I3, I6, I7, I8 and I9. In other words, the processing module 114 may determine that the items I4, I5 and I10 are not included in any ranked predicted items list amongst the ranked predicted items lists 311, 312, 313, 314, 315 and 316. Therefore, the processing module 114 may be configured to generate for the items I1, I2, I3, I6, I7, I8 and I9 the respective item score within a plurality of item scores 355 based on the totality of ranks associated with each of the items I1, I2, I3, I6, I7, I8 and I9.

For example, the processing module 114 may determine that the totality of ranks associated with the item I1 is "4". In other words, the processing module 114 may determine that the item I1 has four associated ranks within six ranked predicted items lists. Therefore, the processing module 114 may generate the item score "4/6" for the item I1. In another example, the processing module 114 may determine that the totality of ranks associated with the item I3 is "6". In other words, the processing module 114 may determine that the item I3 has six associated ranks within six ranked predicted items lists. Therefore, the processing module 114 may generate the item score "6/6" for the item I3. In an additional example, the processing module 114 may determine that the totality of ranks associated with the item I8 is "3". In other words, the processing module 114 may determine that the item I8 has three associated ranks within six ranked predicted items lists. Therefore, the processing module 114 may generate the item score "3/6" for the item I8.

In some embodiments, the processing module 114 may store within the first database 120 the item scores and the respectively associated items within the plurality of ranked predicted items lists 320. In this case, the processing module 114 may store within the first database 120 the items I1, I2, I3, I6, I7, I8 and I9 respectively associated with the item scores "4/6", "4/6", "6/6", "4/6", "5/6", "3/6" and "4/6" as part of the module information.

In additional embodiments of the present technology, the server 112 may be configured to acquire the request 150 for the recommended subset of items 152. In other words, the server 112 may receive the request 150 from the electronic device 104 for sending a signal 153 to the electronic device 104 for displaying the recommended subset of items 152 to the user 102. To that end, the processing module 114 may be configured to generate the recommended subset of items 152.

In some embodiments, the processing module 114 may retrieve from the first database 120 the module information comprising the items I1, I2, I3, I6, I7, I8 and I9 (i.e., the items I1, I2, I3, I6, I7, I8 and I9 being within the set of potentially recommendable items 200 and within the plurality of ranked predicted items lists 320) respectively associated with the item scores "4/6", "4/6", "6/6", "4/6", "5/6", "3/6" and "4/6". In other embodiments, the processing module 114 may retrieve the module information comprising the table 310. The processing module 114 may select at least one item within the plurality of ranked predicted items lists 320 as the recommended subset of items 152 based on the item scores of the items within the plurality of ranked predicted items lists 320.

For example, the processing module 114 may select the item I3 as the recommended subset of items 152 based on the respective item score "6/6" since the item score "6/6" is higher than any other item score within the plurality of item scores 355. In another example, the processing module 114 may select the items I3 and I7 as the recommended subset of items 152 based on the respective item scores "6/6" and "5/6" since the item scores "6/6" and "5/6" are higher than any other item score within the plurality of item scores 355. In an additional example, the processing module 114 may select the items I1, I2, I3, I6, I7, I8 and I9 as the recommended subset of items 152 since each one of the items I1, I2, I3, I6, I7, I8 and I9 has the respective item score within the plurality of item scores 355 associated therewith.

In additional embodiments, the processing module 114 may select the at least one item within the plurality of ranked predicted items lists 320 as the recommended subset of items 152 based on a predefined rule. For example, the predefined rule may be predefined by a human assessor. The predefined rule may be based on the item scores of the items within the plurality of ranked predicted items lists 320 to indicate how many items may be selected by the processing module 114 as the recommended subset of items 152.

In some embodiments, the processing module 114 may rank the at least one item within the recommended subset of items 152 based on the respective item scores and the respectively associated ranks within the plurality of ranked predicted items lists 320. For example, if the processing module 114 selected the items I1, I2, I3, I6, I7, I8 and I9 as the recommended subset of items 152, the processing module 114 may rank the items I1, I2, I3, I6, I7, I8 and I9 based on the respective item scores and the respectively associated ranks thereof within the plurality of ranked predicted items lists 320.

For example, the processing module 114 may rank the item I3 as a first item within the recommended subset of items 152 since the item I3 is associated with a highest item score amongst the plurality of item scores 355. The processing module 114 may rank the item I7 as the second item within the recommended subset of items 152 since the item I7 is associated with a second highest item score amongst the plurality of item scores 355.

Next, the processing module 114 may rank the items I1, I2, I6 and I9 since they are associated with a third highest item score amongst the plurality of item scores 355. In some embodiments, if more than one item within the recommended subset of items 152 are associated with an equal item score, the processing module may rank the more than one item within the recommended subset of items 152 based on the respectively associated ranks within the plurality of ranked predicted items lists 320.

For example, the processing module 114 may determine based on the table 310 that the item I1 has the associated ranks of "3" "2" "1" and "3". The processing module 114 may determine based on the table 310 that the item I2 has the associated ranks of "1" "3" "1" and "1". The processing module 114 may determine based on the table 310 that the item I6 has the associated ranks of "5" "4" "5" and "4". The processing module 114 may determine based on the table 310 that the item I9 has the associated ranks of "1" "5" "3" and "4". As a result, the processing module may determine that the item I1 has an average associated rank of "2.25", the item I2 has the average associated rank of "1.5", the item I6 has the average associated rank of "4.5" and the item I9 has the average associated rank of "3.5". Therefore, the processing module 114 may rank items I2, I1, I9 and I6 as a third, a fourth, a fifth and a sixth item, respectively, within the recommended subset of items 152 based on their respective average associated rank.

The processing module may rank the item I8 as a seventh item within the recommended subset of items 152 since the item I8 is associated with a lowest item score amongst the plurality of item scores 355. Therefore, in this case, the processing module 114 may rank the items I3, I7, I2, I1, I9, I6 and I8 as the first, second, third, fourth, fifth, sixth and seventh item, respectively, within the recommended subset of items 152. In other words, the item I3 may be determined as the most relevant item within the recommended subset of items 152 and the item I8 may be determined as a most irrelevant item within the recommended subset of items 152. In this case, with reference to FIG. 5, the highlighted recommended item 570 may be the item I3.

In some embodiments of the present technology, the server 112 may be further configured to send the signal 153 to the electronic device 104 for displaying the recommended subset of items 152 to the user 102.

Figure 7:
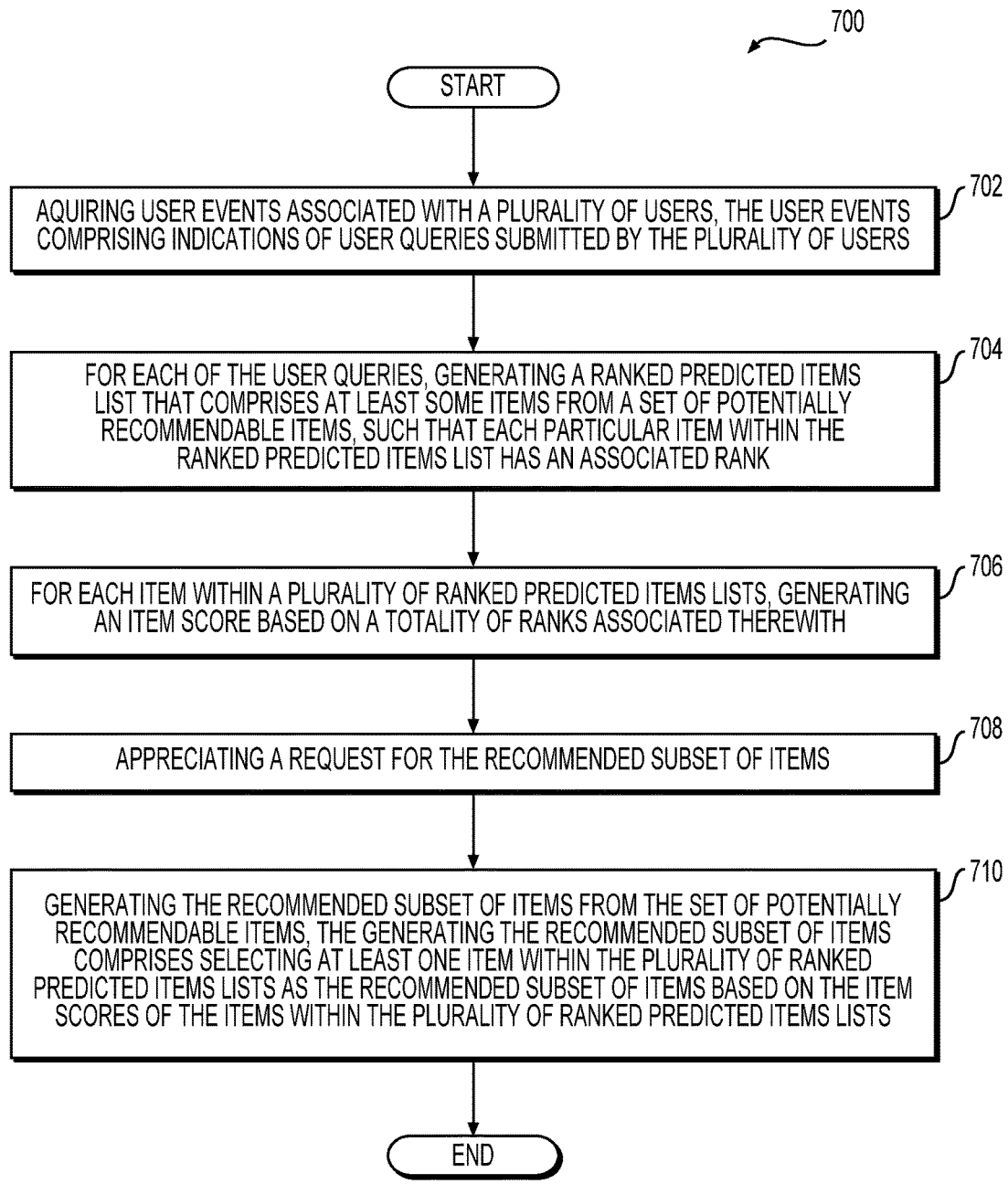
FIG. 7 depicts a block diagram of a method, the method being executable within the system of FIG. 1 and being implemented in accordance with non-limiting embodiments of the present technology.

FIG. 7 depicts a flowchart of a method 700 which may be executed by the server 112 in some implementations of the present technology. The method 700 will be further described below.

STEP 702: Acquiring User Events

The method 700 begins at step 702 with the server 112 acquiring the user events associated with the plurality of users 103, wherein the user events comprise the indications of the user queries associated with the plurality of users 103.

In some embodiments, the prediction module 116 may retrieve the user events comprising the indications of the user queries associated with the plurality of users 103 from the third database 124.

In other embodiments, the indications of the user queries may comprise the respectively associated user query contexts. For example, each respective user query context may comprise the date of the user query, the time of the user query, the geo-location from which the user query originated and the like.

STEP 704: Generating a Ranked Predicted Items List for Each of the User Queries The method 700 continues to step 704 with the server 112 generating for each of the user queries the ranked predicted items list that comprises at least some items from the set of potentially recommendable items 200 such that each particular item within the ranked predicted items list has the associated rank.

In some embodiments, the server 112 may generate the respective ranked predicted items list for each user query within the set of user queries 202. In other embodiments, the set of user queries 202 may comprise only the portion of the user queries having associated with the plurality of users 103.

In other embodiments, the server 112 may generate the plurality of ranked predicted items lists 320. To that end, the server 112 may input the user queries within the set of user queries 202 and the respectively associated user query contexts into the ranking model algorithm 204. The server 112 may input the items from the set of potentially recommendable items 200 into the ranking model algorithm 204. The server 112 may retrieve from the ranking model algorithm 204 the plurality of potential ranked predicted items lists 220 which comprise the items from the set of potentially recommendable items 200 and wherein each item is ranked based on the respective associated rank within each potential ranked predicted items list. For example, the server 112 may retrieve the table 210 from the ranking model 204.

In additional embodiments, the server 112 may determine the ranked predicted items lists 311, 312, 313, 314, 315 and 316 depicted in FIG. 3 based on the respective potential ranked predicted items lists 211, 212, 213, 214, 215 and 216 depicted in FIG. 2. The determining the ranked predicted items lists 311, 312, 313, 314, 315 and 316 may comprise truncating the potential ranked predicted items lists 211, 212, 213, 214, 215 and 216 based on the list threshold 330 depicted in FIG. 3, wherein the list threshold 330 may be the maximum number of items within each ranked predicted items list.

In another embodiment, the server 112 may determine the table 310 by truncating from the table 210 the truncated part 340 of table 210 based on the list threshold 330. The server 112 may further store the table 210 and/or the table 310 in the first database 120 as part of the module information.

STEP 706: Generating an Item Score for Each Item within a Plurality of Ranked Predicted Items Lists The method 700 continues to step 706 with the server 112 generating for each item within the plurality of ranked predicted items lists 320 the respective item score based on the totality of ranks associated therewith.

In some embodiments, the server 112 may generate the plurality of item scores 355 wherein each item score is associated with the respective item within the plurality of ranked predicted items lists 320. For example, the processing module 114 may determine that the totality of ranks associated with the item I1 is "4". In other words, the processing module 114 may determine that the item I1 has four associated ranks within six ranked predicted items lists. Therefore, the processing module 114 may generate the item score "4/6" for the item I1.

In other embodiments, the server 112 may store the items within the plurality of ranked predicted items lists 320 with the respectively associated item scores in the first database 120 as part of the module information.

STEP 708: Acquiring a Request for the Recommended Subset of Items

The method 700 continues to step 708 with the server 112 acquiring the request 150 for the recommended subset of items 152.

STEP 710: Generating the Recommended Subset of Items

The method 700 ends at step 710 with the server 112 generating the recommended subset of items 152. The generating the recommended subset of items 152 may comprise selecting the at least one item within the plurality of ranked predicted items lists 320 as the recommended subset of items 152 based on the item scores of the items within the plurality of ranked predicted items lists 320.

For example, the server 112 may select the item I3 as the recommended subset of items 152 based on the respectively associated item score "6/6" since the respectively associated item score "6/6" is the highest item score amongst the plurality of item scores 355 of the items within the plurality of ranked predicted items lists 320.

The generating the recommended subset of items 152 may comprise ranking, by the server 112, the at least one item within the recommended subset of items 152 based on the respective item scores and the respectively associated ranks. For example, the server 112 may rank the items within the plurality of ranked predicted items lists 320 based on their respective item scores.

In some embodiments, the items within the plurality of ranked predicted items lists 320 that are associated with a same item score may further be ranked based on their respective average associated rank within the plurality of ranked predicted items lists 320.

In other embodiments, the server 112 may send the signal 153 to the electronic device 104 for displaying the recommended subset of items 152 to the user 102.

The method 700 ends at the step 710.

In some implementations of the present technology, the server 112 executing the method 700 may reduce a time delay between the server 112 acquiring the request 150 for the recommended subset of items 152 and the server 112 sending the signal 153 to the electronic device 104 displaying the recommended subset of items 152 to the user 102. In other words, the execution of the method 700 in some embodiments of the present technology may reduce a required amount of time for generating the recommended subset of items 152 and furnishing the user 102 therewith. For example, the server 112 may generate the recommended subset of items 152 in real-time. In other words, the server 112 may generate the recommended subset of items 152 following the acquiring of the request 150. The server 112 executing the method 700 in real-time may reduce the required amount of time for generating the recommended subset of items 152.

In other implementations of the present technology, the method 700 may be executed by the server 112 in an offline mode. In other words, the recommended subset of items 152 may be generated and stored by the server 112 prior to acquiring the request 150 for the recommended subset of items 152. Therefore, in some implementations, the server 112 having executed the method 700 may require less processing power for sending the signal 153 to the electronic device 104 after acquiring the request 150. It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

CLAUSE 1. A method (700) of generating a recommended subset of items (152) for a user (102) of an electronic device (104), the method (700) being executed at a server (112), the method (700) comprises:
acquiring (702), by the server (112), user events associated with a plurality of users (103), the user events comprising indications of user queries associated with the plurality of users (103);
for each of the user queries, generating (704), by the server (112), a ranked predicted items list that comprises at least some items from a set of potentially recommendable items (200), such that each particular item within the ranked predicted items list has an associated rank;
for each item within a plurality of ranked predicted items lists (320), generating (706), by the server (112), an item score based on a totality of ranks associated therewith;
acquiring (708), by the server (112), a request (150) for the recommended subset of items (152); and
generating (710), by the server (112), the recommended subset of items (152) from the set of potentially recommendable items (200), the generating (710) the recommended subset of items (152) comprises selecting, by the server (112), at least one item within the plurality of ranked predicted items lists (320) as the recommended subset of items (152) based on the item scores of the items within the plurality of ranked predicted items lists (320).

CLAUSE 2. The method (700) of clause 1, wherein each ranked predicted items list is associated with a respective user query.

CLAUSE 3. The method (700) of clause 2, wherein each indication of the user query comprises a respective user query context.

CLAUSE 4. The method (700) of clause 3, the generating (704) the plurality of ranked predicted items lists (320) comprises, for each ranked predicted items list:
inputting, by the server (112), the respective user query and the user query context into a ranking model algorithm (204); and
inputting, by the server (112), the items from the set of potentially recommendable items (200) into the ranking model algorithm (204).

CLAUSE 5. The method (700) of clause 4, wherein the generating (704) the plurality of ranked predicted items lists (320) further comprises, for each ranked predicted items list, retrieving by the server (112), from the ranking model algorithm (204) a potential predicted items list comprising the items from the set of potentially recommendable items (200), wherein each item is ranked within the potential ranked predicted items list.

CLAUSE 6. The method (700) of clause 5, wherein the generating (704) the plurality of ranked predicted items lists (320) further comprises, for each ranked predicted items list, determining by the server (112), the ranked predicted items list based on the potential ranked predicted items list, the determining the ranked predicted items list comprises truncating, by the server (112), the potential ranked predicted items list based on a list threshold (330), the list threshold (330) being a maximum number of items within the ranked predicted items list.

CLAUSE 7. The method (700) of clause 1, wherein the generating (710) the recommended subset of items (152) comprises ranking, by the server (112), the at least one item within the recommended subset of items (152) based on the respective item scores.

CLAUSE 8. The method (700) of clause 7, wherein the ranking the at least one item within the recommended subset of items (152) is further based on the respectively associated ranks of the at least one item.

CLAUSE 9. The method (700) of clause 8, wherein the ranking the at least one item within the recommended subset of items (152) is based on the respective item scores and the respectively associated ranks comprises determining, by the server (112), a respective average associated rank for items within the at least one item having a same item score.

CLAUSE 10. The method (700) of clause 9, the method (700) further comprises sending, by the server (112), a signal (153) to the electronic device (104) for displaying the recommended subset of items (152) to the user (102).

CLAUSE 11. The method (700) of clause 1, wherein the generating (710) the recommended subset of items (152) from the set of potentially recommendable items (200) is executed prior to the acquiring (708) the request (150) for the recommended subset of items (152).

CLAUSE 12. The method (700) of clause 11, wherein the generating (710) the recommended subset of items (152) from the set of potentially recommendable items (200) is executed in an offline mode.

CLAUSE 13. The method (700) of clause 1, the generating (710) the recommended subset of items (152) from the set of potentially recommendable items (200) is executed in real-time.

CLAUSE 14. A server (112) comprising a processing module (114) and a database (120) for generating a recommended subset of items (152) for a user (102) of an electronic device (104), the server (112) being configured to execute the method (700) in clauses 1 to 13.

What is claimed is:

1. A method of generating a recommended subset of items for a user of an electronic device, the method being executed at a server, the method comprises:
prior to acquiring a request for the recommended subset of items, acquiring, by the server, user events associated with a plurality of users, the user events comprising indications of user queries associated with the plurality of users;
prior to acquiring the request, for each of the user queries, generating, by the server, a ranked predicted items list that comprises at least some items from a set of potentially recommendable items, such that each particular item within the ranked predicted items list has an associated rank;

prior to acquiring the request, for each item within a plurality of ranked predicted items lists, generating, by the server, an item score based on a totality of ranks associated therewith;

prior to acquiring the request, generating, by the server, the recommended subset of items from the set of potentially recommendable items, the generating the recommended subset of items comprises selecting, by the server, at least one item within the plurality of ranked predicted items lists as the recommended subset of items based on the item scores of the items within the plurality of ranked predicted items lists;

acquiring, by the server, the request for the recommended subset of items; and after acquiring the request, sending a signal, by the server to the respective electronic device, for displaying at least one item selected from the recommended subset of items.

2. The method of claim 1, wherein each ranked predicted items list is associated with a respective user query.

3. The method of claim 2, wherein each indication of the user query comprises a respective user query context.

4. The method of claim 3, the generating the plurality of ranked predicted items lists comprises, for each ranked predicted items list:

inputting, by the server, the respective user query and the user query context into a ranking model algorithm; and inputting, by the server, the items from the set of potentially recommendable items into the ranking model algorithm.

5. The method of claim 4, wherein the generating the plurality of ranked predicted items lists further comprises, for each ranked predicted items list, retrieving by the server, from the ranking model algorithm a potential ranked predicted items list comprising the items from the set of potentially recommendable items, wherein each item is ranked within the potential ranked predicted items list.

6. The method of claim 5, wherein the generating the plurality of ranked predicted items lists further comprises, for each ranked predicted items list, determining by the server, the ranked predicted items list based on the potential ranked predicted items list, the determining the ranked predicted items list comprises truncating, by the server, the potential ranked predicted items list based on a list threshold, the list threshold being a maximum number of items within the ranked predicted items list.

7. The method of claim 1, wherein the generating the recommended subset of items comprises ranking, by the server, the at least one item within the recommended subset of items based on the respective item scores.

8. The method of claim 7, wherein the ranking the at least one item within the recommended subset of items is further based on the respectively associated ranks of the at least one item.

9. The method of claim 8, wherein the ranking the at least one item within the recommended subset of items is based on the respective item scores and the respectively associated ranks comprises determining, by the server, a respective average associated rank for items within the at least one item having a same item score.

10. A server comprising a hardware processor configured to execute computer-readable instructions and a database for generating a recommended subset of items for a user of an electronic device, the hardware processor being configured to:

prior to acquiring a request for the recommended subset of items, acquire user events associated with a plurality of users, the user events comprising indications of user queries associated with the plurality of users;

prior to acquiring the request, for each of the user queries, generate a ranked predicted items list that comprises at least some items from a set of potentially recommendable items, such that each particular item within the ranked predicted items list has an associated rank;

prior to acquiring the request, for each item within a plurality of ranked predicted items lists, generate an item score based on a totality of ranks associated therewith;

prior to acquiring the request, generate the recommended subset of items from the set of potentially recommendable items, to generate the recommended subset of items the processing module being configured to select at least one item within the plurality of ranked predicted items lists as the recommended subset of items based on the item scores of the items within the plurality of ranked predicted items lists;

acquire the request for the recommended subset of items; and after acquiring the request, send a signal to the respective electronic device for displaying at least one item selected from the recommended subset of items.

11. The server of claim 10, wherein each ranked predicted items list is associated with a respective user query.

12. The server of claim 11, wherein each indication of the user query comprises a respective user query context.

13. The server of claim 12, to generate the plurality of ranked predicted items lists, the hardware processor is configured to, for each ranked predicted items list:

input the respective user query and the user query context into a ranking model algorithm; and input the items from the set of potentially recommendable items into the ranking model algorithm.

14. The server of claim 13, wherein to generate the plurality of ranked predicted items lists, the hardware processor is further configured, for each ranked predicted items list, to retrieve from the ranking model algorithm a potential ranked predicted items list comprising the items from the set of potentially recommendable items, wherein each item is ranked within the potential ranked predicted items list.

15. The server of claim 14, wherein to generate the plurality of ranked predicted items lists, the hardware processor is further configured, for each ranked predicted items list, to determine the ranked predicted items list based on the potential ranked predicted items list, to determine the ranked predicted items list the server being configured to truncate the potential ranked predicted items list based on a list threshold, the list threshold being a maximum number of items within the ranked predicted items list.

16. The server of claim 10, wherein to generate the recommended subset of items, the hardware processor is configured to rank the at least one item within the recommended subset of items based on the respective item scores.

17. The server of claim 16, wherein to rank the at least one item within the recommended subset of items, the hardware processor is configured to rank based on the respectively associated ranks of the at least one item.

18. The server of claim 17, wherein the hardware processor is configured to rank the at least one item within the recommended subset of items based on the respective item scores and the respectively associated ranks, the processor being configured to determine a respective average associated rank for items within the at least one item having a same item score.

\* \* \* \* \*